US011137307B2

(12) United States Patent
Tushima et al.

(10) Patent No.: US 11,137,307 B2
(45) Date of Patent: Oct. 5, 2021

(54) PRESSURE SENSOR

(71) Applicant: AZBIL CORPORATION, Chiyoda-ku (JP)

(72) Inventors: Ayumi Tushima, Chiyoda-ku (JP); Yoshiyuki Ishikura, Chiyoda-ku (JP); Tomohisa Tokuda, Chiyoda-ku (JP); Nozomi Kida, Chiyoda-ku (JP); Yuki Seto, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 655 days.

(21) Appl. No.: 16/065,550

(22) PCT Filed: Dec. 2, 2016

(86) PCT No.: PCT/JP2016/085872
§ 371 (c)(1),
(2) Date: Jun. 22, 2018

(87) PCT Pub. No.: WO2017/110422
PCT Pub. Date: Jun. 29, 2017

(65) Prior Publication Data
US 2021/0123826 A1   Apr. 29, 2021

(30) Foreign Application Priority Data

Dec. 25, 2015 (JP) .............................. JP2015-253627
Dec. 2, 2016 (WO) .................. PCT/JP2016/085872

(51) Int. Cl.
*G01L 13/02* (2006.01)
*G01L 19/00* (2006.01)
*G01L 19/06* (2006.01)

(52) U.S. Cl.
CPC ........ *G01L 13/025* (2013.01); *G01L 19/0061* (2013.01); *G01L 19/0627* (2013.01)

(58) Field of Classification Search
CPC .......................... G01L 13/025; G01L 19/0061; G01L 19/0627
See application file for complete search history.

(56) References Cited

U.S. PATENT DOCUMENTS

| 4,407,296 A | 10/1983 | Anderson |
| 6,901,803 B2 * | 6/2005 | Fandrey .............. G01L 19/0007 73/706 |

(Continued)

FOREIGN PATENT DOCUMENTS

| JP | 55-63228 A | 5/1981 |
| JP | 56-63228 A | 5/1981 |

(Continued)

OTHER PUBLICATIONS

Office Action dated Apr. 18, 2019 in Japanese Patent Application No. 2015-253627, 6 pages (with unedited computer generated English translation).

(Continued)

*Primary Examiner* — Ryan D Walsh
(74) *Attorney, Agent, or Firm* — Oblon, McClelland, Maier & Neustadt, L.L.P.

(57) ABSTRACT

A sensor chip (24) is joined to an inner wall surface (20*a*) of a base body (21-1), with a lower surface (24*a*) of a first retaining member (24-2) serving as a joint surface, in such a manner as to allow an enclosing chamber (23) (including a pressure receiving chamber (23-1) and a pressure guiding passage (23-2)) between a pressure receiving diaphragm (22) and the joint surface (24*a*) of the sensor chip (24) to communicate with a pressure guiding hole (24-2*b*) in the first retaining member (24-2). In this state, a narrow tube (31) made of stainless steel is passed through the pressure guiding passage (23-2) in the base body (21-1) and inserted and secured in the pressure guiding hole (24-2*b*) in the first retaining member (24-2). This reduces the pressure receiving area of a pressure guiding passage that guides a pressure (Continued)

(P1) of a measured fluid to a first surface (24-1*a*) of a sensor diaphragm (24-1), suppresses force applied in the direction of separating the joint between the sensor chip (24) and the base body (21-1), and makes it possible to use a soft adhesive.

2 Claims, 8 Drawing Sheets

(56) References Cited

U.S. PATENT DOCUMENTS

| | | |
|---|---|---|
| 2011/0209552 A1 | 9/2011 | Tham et al. |
| 2014/0144243 A1 | 5/2014 | Tanaka et al. |
| 2020/0363279 A1* | 11/2020 | Tsushima .............. G01L 9/0042 |

FOREIGN PATENT DOCUMENTS

| | | | |
|---|---|---|---|
| JP | 57-70303 U | | 4/1982 |
| JP | 10-300612 A | | 11/1998 |
| JP | 2012242351 A | * | 12/2012 |
| JP | 2014-102108 A | | 6/2014 |
| JP | 2014-106184 A | | 6/2014 |

OTHER PUBLICATIONS

International Search Report dated Jan. 24, 2017 in PCT/JP2016/085872 filed Dec. 2, 2016.

\* cited by examiner

PRESSURE SENSOR

TECHNICAL FIELD

The present invention relates to a pressure sensor that uses a sensor diaphragm configured to output a signal corresponding to a difference between pressures received by one surface and the other surface of the sensor diaphragm.

BACKGROUND ART

Conventionally, a pressure sensor using a sensor diaphragm has been used as an industrial pressure sensor. The sensor diaphragm is configured to output a signal corresponding to a difference between pressures received by one surface and the other surface of the sensor diaphragm (see, e.g., Patent Literature (PTL) 1).

This pressure sensor is configured to guide the pressure of a measured fluid received by a pressure receiving diaphragm to one surface of the sensor diaphragm using a pressure transmitting medium (enclosed liquid), such as silicone oil, detect a strain in the sensor diaphragm caused by the pressure difference between the one surface and the other surface as, for example, a change in resistance value in a strain resistance gauge, convert the change in resistance value to an electric signal, and extract the electric signal.

Figure 7:
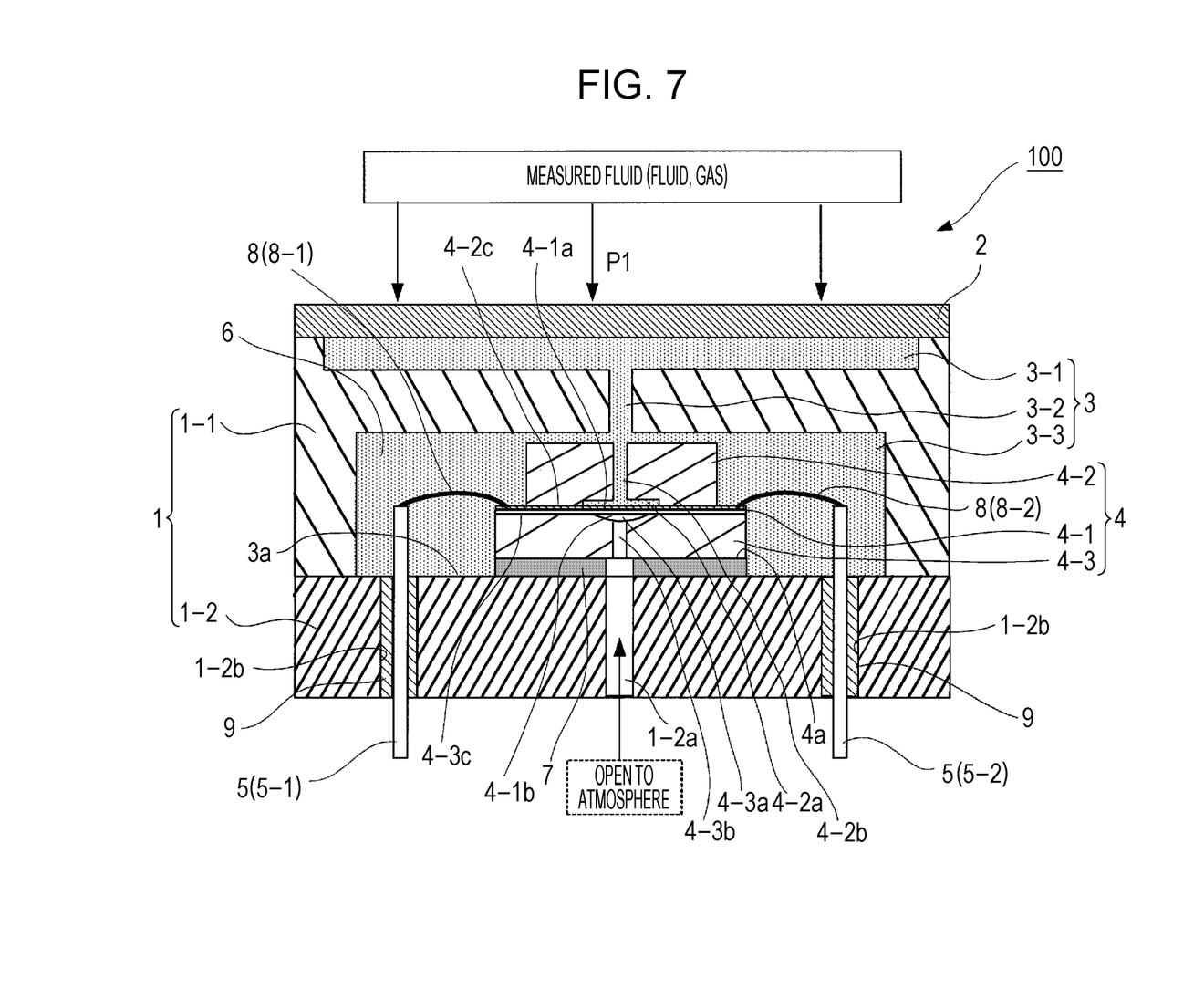
FIG. 7 is a cross-sectional view illustrating a configuration of a main part of a conventional pressure sensor.

FIG. 7 illustrates a main part of a related pressure sensor. In the drawing, reference numeral 1 denotes a body made of metal, reference numeral 2 denotes a pressure receiving diaphragm, reference numeral 3 denotes an enclosing chamber formed inside the body 1, reference numeral 4 denotes a sensor chip disposed in the enclosing chamber 3, and reference numeral 5 (5-1, 5-2) denotes an electrode pin.

In a pressure sensor 100, the body 1 is formed by a base body 1-1 and a cover body 1-2, and the enclosing chamber 3 is formed by a pressure receiving chamber 3-1, a pressure guiding passage 3-2, and a sensor chamber 3-3. The pressure receiving diaphragm 2 is secured by welding an outer edge thereof to the upper surface of the base body 1-1. The pressure receiving chamber 3-1 is formed on the back surface of the pressure receiving diaphragm 2. The pressure receiving chamber 3-1 communicates with the sensor chamber 3-3 through the pressure guiding passage 3-2. An enclosed liquid 6 is enclosed in the enclosing chamber 3 formed by the pressure receiving chamber 3-1, the pressure guiding passage 3-2, and the sensor chamber 3-3.

The sensor chip 4 is formed by a sensor diaphragm 4-1, and a first retaining member 4-2 and a second retaining member 4-3 joined to each other with the sensor diaphragm 4-1 interposed therebetween. The sensor diaphragm 4-1 is a thin sheet-like diaphragm made of, for example, silicon or glass and having a strain resistance gauge formed on a surface thereof. In FIG. 7, the surface of the sensor diaphragm 4-1 having the strain resistance gauge formed thereon is indicated by diagonal lines.

The retaining members 4-2 and 4-3 are also made of silicon, glass, or the like. The first retaining member 4-2 has a recessed portion 4-2a and a pressure introducing hole (pressure guiding hole) 4-2b communicating with the recessed portion 4-2a, and the second retaining member 4-3 has a recessed portion 4-3a and a pressure introducing hole (pressure guiding hole) 4-3b communicating with the recessed portion 4-3a. The recessed portion 4-2a of the first retaining member 4-2 has a flat bottom surface, whereas the recessed portion 4-3a of the second retaining member 4-3 has a curved (aspheric) bottom surface along displacement of the sensor diaphragm 4-1.

The first retaining member 4-2 is jointed to one surface (first surface) 4-1a of the sensor diaphragm 4-1, with a surrounding region 4-2c of the recessed portion 4-2a facing the first surface 4-1a of the sensor diaphragm 4-1. The second retaining member 4-3 is joined to the other surface (second surface) 4-1b of the sensor diaphragm 4-1, with a surrounding region 4-3c of the recessed portion 4-3a facing the second surface 4-1b of the sensor diaphragm 4-1.

In the pressure sensor 100, the sensor chip 4 is disposed in the sensor chamber 3-3. A bottom surface 4a of the sensor chip 4 (or a lower surface of the second retaining member 4-3) having an epoxy adhesive applied thereto is joined to a bottom surface 3a of the sensor chamber 3-3 (or an inner wall surface of the cover body 1-2). That is, the bottom surface 4a of the sensor chip 4 and the bottom surface 3a of the sensor chamber 3-3 are joined to each other, with a layer of an adhesive material (adhesive layer) 7 interposed therebetween. The cover body 1-2 has, at a position corresponding to the pressure guiding hole 4-3b in the second retaining member 4-3 of the sensor chip 4, a passage (pressure guiding passage) 1-2a for introducing an atmospheric pressure into the pressure guiding hole 4-3b.

In the pressure sensor 100, the areas of respective surfaces of the first retaining member 4-2 and the second retaining member 4-3 facing each other, with the sensor diaphragm 4-1 interposed therebetween, are different. In this example, the sensor chip 4 has a stepped structure in which the area of the first retaining member (upper retaining member) 4-2 is smaller than the area of the second retaining member (lower retaining member) 4-3. In the stepped structure of the sensor chip 4, wires 8 (8-1, 8-2) are extended from the surface of the sensor diaphragm 4-1 having the strain resistance gauge thereon and located at an outer edge of one of the first retaining member 4-2 and the second retaining member 4-3, the one (second retaining member 4-3) extending outward from the other retaining member. The wires 8 (8-1, 8-2) extended from the sensor diaphragm 4-1 are connected to the respective electrode pins 5 (5-1, 5-2).

One end portion of each of the electrode pins 5 is positioned inside the sensor chamber 3-3, and the other end portion of the electrode pin 5 is passed through the cover body 1-2 and positioned outside the sensor chamber 3-3. The cover body 1-2 has insertion holes 1-2b, through which the respective electrode pins 5 pass. For electrical insulation between the cover body 1-2 and each of the electrode pins 5 and prevention of leakage of the enclosed liquid 6, the insertion holes 1-2b in the cover body 1-2 are each hermetically sealed with a sealing material 9.

In the pressure sensor 100, a pressure P1 from a measured fluid (fluid, gas) is received by the pressure receiving diaphragm 2. The pressure P1 of the measured fluid received by the pressure receiving diaphragm 2 is transmitted to the enclosed liquid 6 in the enclosing chamber 3, passes through the pressure receiving chamber 3-1, the pressure guiding passage 3-2, and the sensor chamber 3-3 to enter the pressure guiding hole 4-2b in the first retaining member 4-2, and is guided to the first surface 4-1a of the sensor diaphragm 4-1. The second surface 4-1b of the sensor diaphragm 4-1 is open to the atmosphere through the pressure guiding hole 4-3b in the second retaining member 4-3.

This causes a strain in the sensor diaphragm 4-1. The strain in the sensor diaphragm 4-1 is detected as a change in resistance value in the strain resistance gauge. The change in resistance value is converted to an electric signal (i.e., a signal corresponding to a pressure difference), transmitted through the wires 8 (8-1, 8-2), and extracted from the electrode pins 5 (5-1, 5-2).

When the sensor diaphragm 4-1 is displaced by an excessive pressure applied to the first surface 4-1a of the sensor diaphragm 4-1, the entire displaced surface is received by the curved surface of the recessed portion 4-3a of the second retaining member 4-3. This prevents excessive displacement caused by the excessive pressure applied to the sensor diaphragm 4-1, prevents stress concentration on the outer region of the sensor diaphragm 4-1 to avoid breakage of the sensor diaphragm 4-1 caused by the application of the excessive pressure, and improves resistance of the sensor diaphragm 4-1 to pressure.

In the pressure sensor 100, to protect the sensor chip 4 from an external corrosive environment, such as a measured medium, the sensor chip 4 is placed in the enclosing chamber 3 formed inside the body 1, and the enclosing chamber 3 is filled with the enclosed liquid (pressure transmitting medium) 6, such as silicone oil.

In this case, the enclosed liquid 6 and the wires 8 for extracting an electric signal from the sensor diaphragm 4-1 are in the same enclosing chamber 3. Therefore, when the electrode pins 5 connected to the wires 8 are drawn to the outside, the cover body 1-2 needs to be hermetically sealed. This makes the structure complex, hinders size reduction, and leads to increased cost.

Since the entire sensor chip 4 is placed in the enclosing chamber 3, the size of the enclosing chamber 3 (or oil volume therein), that is, the amount of the enclosed liquid 6 used is increased and this affects the temperature characteristics of the pressure sensor 100. To reduce the amount of the enclosed liquid 6 used, the enclosing chamber 3 may have oil spacers therein. However, adding the oil spacers leads to increased cost.

Figure 8:
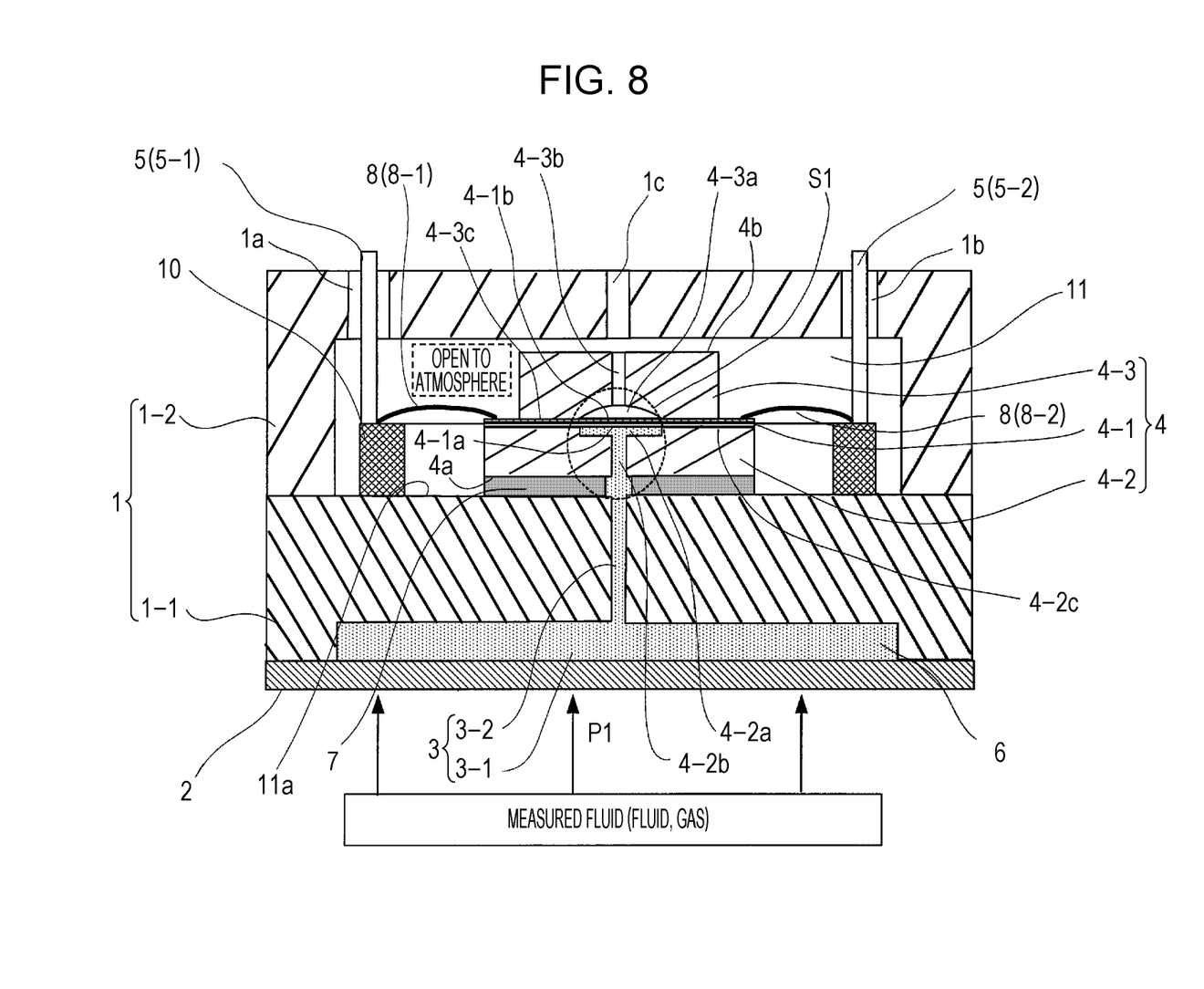
FIG. 8 is a cross-sectional view illustrating a configuration of a main part of a pressure sensor considered by the applicant in the process leading to the present invention.

Accordingly, as illustrated in FIG. 8, the present applicant has considered joining the sensor chip 4 to the base body 1-1, with the surface 4a of the sensor chip 4 (or a lower surface of the first retaining member 4-2) on the side of introducing the pressure of the measured fluid, the surface 4a having an epoxy adhesive applied thereto, serving as a joint surface, and making a space (sensor chamber) 11 containing the sensor chip 4 therein and surrounded by the base body 1-1 and the cover body 1-2 open to the atmosphere. In this example, the sensor chip 4 has a stepped structure in which the area of the second retaining member (upper retaining member) 4-3 is smaller than the area of the first retaining member (lower retaining member) 4-2. Also, the electrode pins 5 (5-1, 5-2) are provided in a relay terminal 10, which is bonded to a bottom surface 11a of the sensor chamber 11.

With this structure, the enclosing chamber 3 formed by the pressure receiving chamber 3-1 and the pressure guiding passage 3-2 in the base body 1-1 communicates with the pressure guiding hole 4-2b in the first retaining member 4-2, and a pressure from the measured fluid received by the pressure receiving diaphragm 2 is guided by the enclosed liquid 6 in the enclosing chamber 3, through the pressure guiding hole 4-2b in the first retaining member 4-2, to the first surface 4-1a of the sensor diaphragm 4-1.

Thus, only an internal space (sensor portion S1) in the sensor chip 4 is in contact with the enclosed liquid 6 and the entire sensor chip 4 is positioned outside the enclosing chamber 3. This eliminates the need to hermetically seal through holes 1a and 1b in the cover body 1-2 through which the electrode pins 5 (5-1, 5-2) pass. Also, it is possible to reduce the size of the enclosing chamber 3 and minimize the amount of the enclosed liquid 6 used.

However, in the structure illustrated in FIG. 8, the enclosed liquid 6 that passes through the pressure guiding hole 4-2b in the first retaining member 4-2 acts in the direction of peeling off the adhesive layer 7 (i.e., in the direction of separating the joint between the sensor chip 4 and the base body 1-1). Therefore, the sensor chip 4 needs to be firmly joined to the base body 1-1 by using a hard adhesive, such as an epoxy adhesive, to form the adhesive layer 7.

As a result, when, for example, the ambient temperature changes, a difference in linear expansion coefficient causes thermal stress to be applied to the bottom surface (joint surface) of the sensor chip 4 in the shear direction. This may separate the joint between the sensor chip 4 and the base body 1-1 and lead to breakage.

Figure 9:
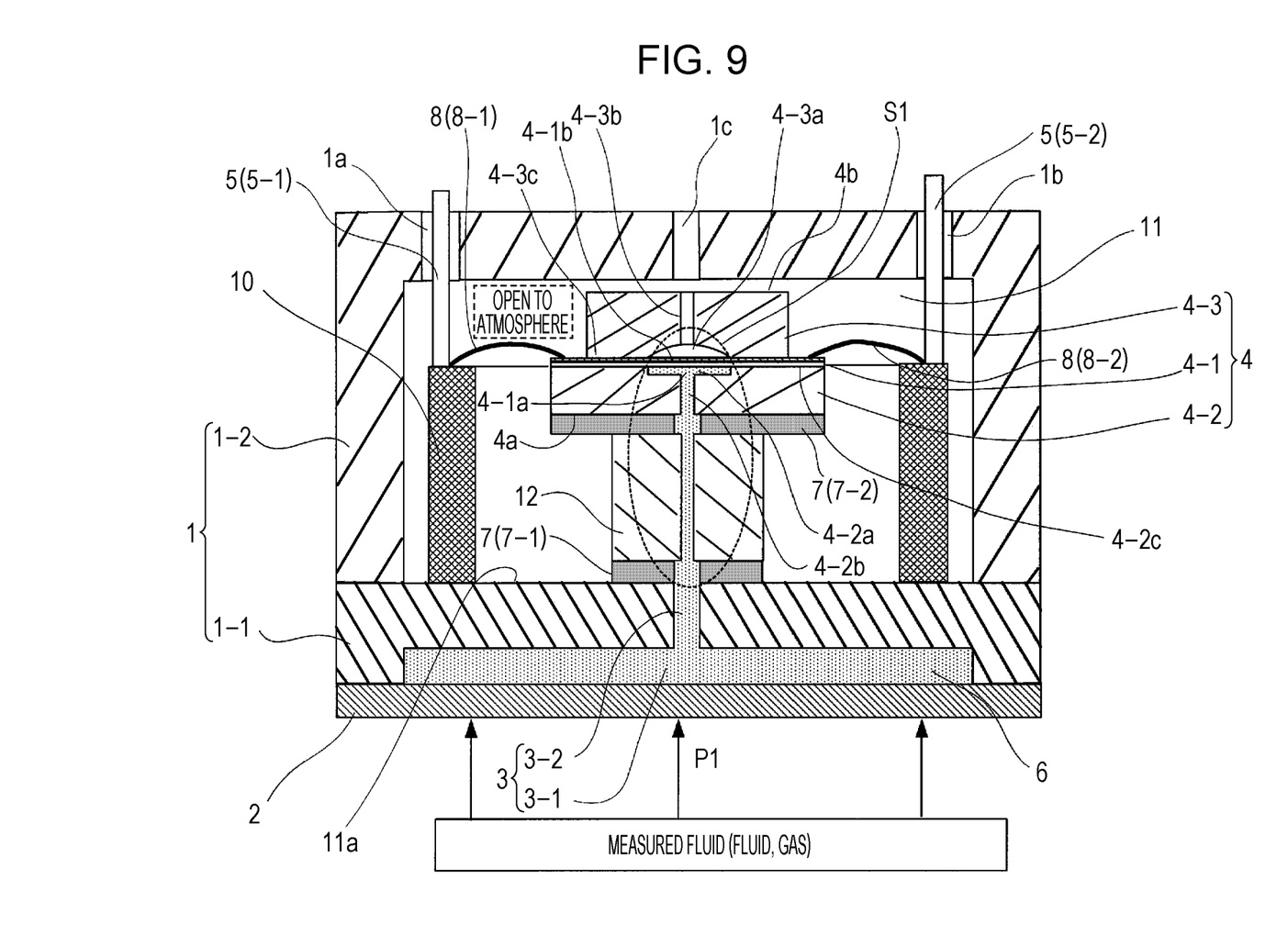
FIG. 9 illustrates an example where a thermal stress reducing base is provided between the bottom surface of the sensor chip and the bottom surface of the sensor chamber.

As a solution to this, as illustrated in FIG. 9, a base (thermal stress reducing base) 12 of a material with high pressure resistance and low linear expansion coefficient (e.g., Kovar, resin) may be bonded between the bottom surface 4a of the sensor chip 4 (or the lower surface of the first retaining member 4-2) and the bottom surface 11a of the sensor chamber 11 (or an inner wall surface of the base body 1-1) to reduce the thermal stress. However, the material with high pressure resistance and low linear expansion coefficient is expensive and using this material leads to increased cost. Moreover, a sufficient height needs to be secured in the direction of thickness of the thermal stress reducing base 12 and this hinders size reduction.

CITATION LIST

Patent Literature

PTL 1: Japanese Unexamined Patent Application Publication No. 10-300612

SUMMARY OF INVENTION

Technical Problem

The present invention has been made to solve the problems described above. An object of the present invention is to provide a pressure sensor that can achieve both improved pressure resistance and reduced thermal stress at the same time.

Solution to Problem

To achieve the object described above, the present invention includes a sensor chip including a sensor diaphragm configured to output a signal corresponding to a difference between pressures received by a first surface and a second surface of the sensor diaphragm, a first retaining member joined to the first surface of the sensor diaphragm, and a second retaining member joined to the second surface of the sensor diaphragm, wherein the first retaining member has a first recessed portion formed in an end surface thereof joined to the first surface of the sensor diaphragm and a first pressure guiding hole open into the first recessed portion to guide a pressure of a measured fluid to the first surface of the sensor diaphragm, and the second retaining member has a second recessed portion formed in an end surface thereof joined to the second surface of the sensor diaphragm and a second pressure guiding hole open into the second recessed portion to allow the second surface of the sensor diaphragm to be open to the atmosphere; a body to which the sensor chip is joined, the body having a pressure guiding passage configured to guide the pressure of the measured fluid to the first pressure guiding hole in the first retaining member; and a narrow tube having an inside diameter smaller than an inside diameter of the first pressure guiding hole in the first retaining member, passed through the pressure guiding passage in the body, and inserted and secured in the first pressure guiding hole in the first retaining member in such a manner as to guide the pressure of the measured fluid to the first surface of the sensor diaphragm.

In this invention, the body has the pressure guiding passage, through which the narrow tube is inserted and secured in the first pressure guiding hole in the first retaining member of the sensor chip. The narrow tube has an inside diameter smaller than the inside diameter of the first pressure guiding hole in the first retaining member. Through the narrow tube, the pressure of the measured fluid is guided to the first surface of the sensor diaphragm. That is, in the present invention, a passage in the narrow tube having an inside diameter smaller than the inside diameter of the first pressure guiding hole in the first retaining member serves as an actual pressure guiding passage that guides the pressure of the measured fluid to the first surface of the sensor diaphragm.

This reduces the pressure receiving area of the pressure guiding passage that guides the pressure of the measured fluid to the first surface of the sensor diaphragm, suppresses force applied in the direction of separating the joint between the sensor chip and the body, and provides a structure more resistant to high pressure. A soft adhesive (i.e., an adhesive with a low Young's modulus) can be used to join the sensor chip to the body. With a layer of this soft adhesive, thermal stress in the shear direction can be reduced. It is thus possible to avoid separation of the joint between the sensor chip and the body, not only under high pressure but also when the ambient temperature changes.

Advantageous Effects of Invention

In the present invention, the narrow tube having an inside diameter smaller than the inside diameter of the first pressure guiding hole in the first retaining member of the sensor chip is passed through the pressure guiding passage in the body and inserted and secured in the first pressure guiding hole in the first retaining member. Through the narrow tube thus inserted and secured, the pressure of the measured fluid is guided to the first surface of the sensor diaphragm. This reduces the pressure receiving area of the pressure guiding passage that guides the pressure of the measured fluid to the first surface of the sensor diaphragm, suppresses force applied in the direction of separating the joint between the sensor chip and the body, and makes it possible to use a soft adhesive to join the sensor chip and the body. It is thus possible to achieve both improved pressure resistance and reduced thermal stress at the same time.

DESCRIPTION OF EMBODIMENTS

Figure 1:
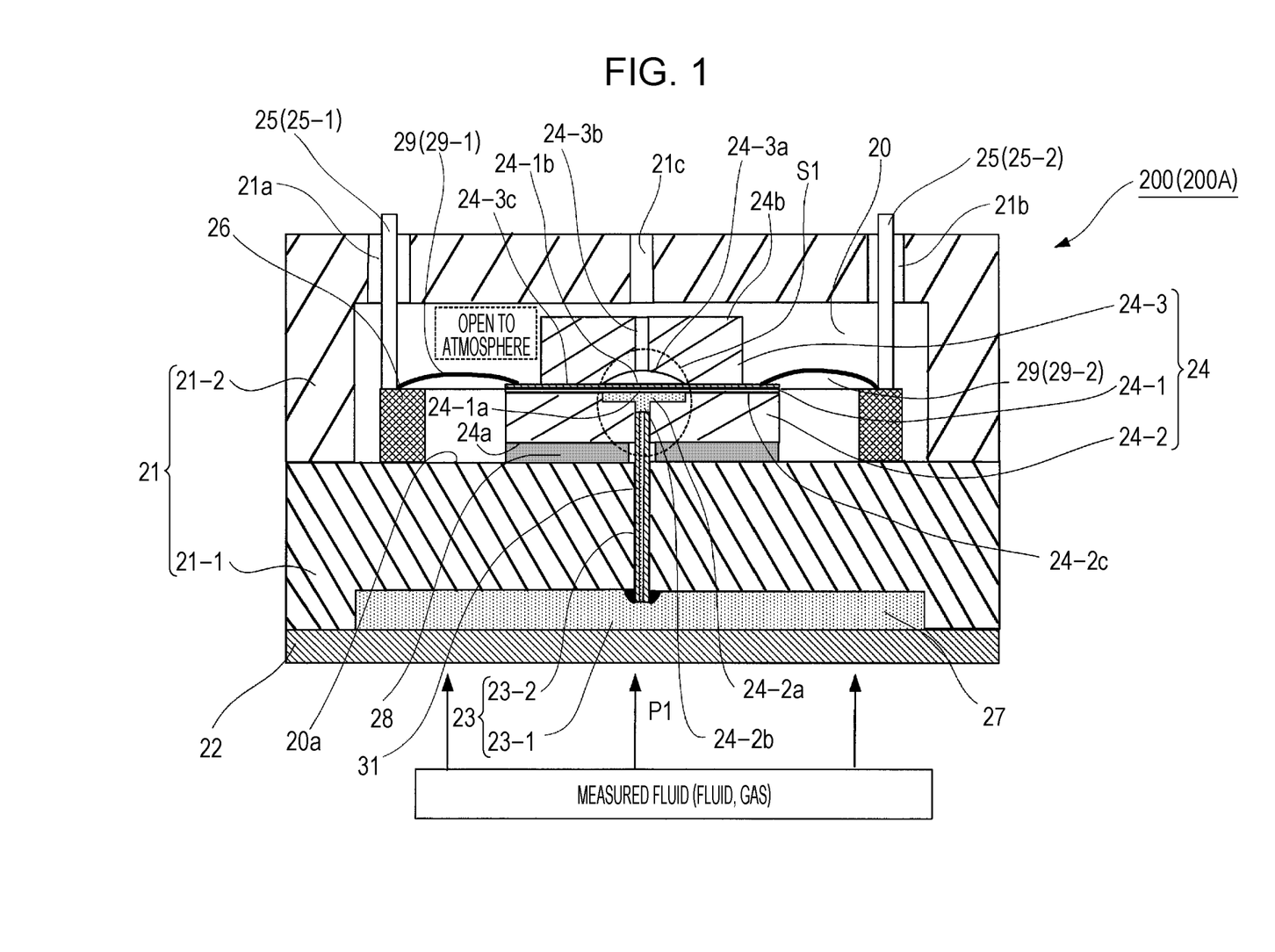
FIG. 1 is a cross-sectional view illustrating a configuration of a main part of a pressure sensor according to an embodiment of the present invention.

Embodiments of the present invention will now be described in detail on the basis of the drawings. FIG. 1 illustrates a configuration of a main part of a pressure sensor according to an embodiment of the present invention.

In FIG. 1, reference numeral 21 denotes a body made of metal, reference numeral 22 denotes a pressure receiving diaphragm, reference numeral 23 denotes an enclosing chamber in the body 21, reference numeral 24 denotes a sensor chip, reference numeral 25 (25-1, 25-2) denotes an electrode pin, and reference numeral 26 denotes a relay terminal provided with the electrode pins 25 (25-1, 25-2).

In a pressure sensor 200 (200A), the body 21 is formed by a base body 21-1 and a cover body 21-2, and the base body 21-1 has an enclosing chamber 23 formed by a pressure receiving chamber 23-1 and a pressure guiding passage 23-2. The sensor chip 24 is in a sensor chamber 20 surrounded by the base body 21-1 and the cover body 21-2. The sensor chamber 20 is open to the atmosphere via through holes 21a, 21b, and 21c formed in the cover body 21-2.

The pressure receiving diaphragm 22 is secured by welding an outer edge thereof to the lower surface of the base body 21-1. The pressure receiving chamber 23-1 is formed on the back surface of the pressure receiving diaphragm 22, and the pressure guiding passage 23-2 is formed in the center of the pressure receiving chamber 23-1.

The sensor chip 24 is formed by a sensor diaphragm 24-1, and a first retaining member 24-2 and a second retaining member 24-3 joined to each other with the sensor diaphragm 24-1 interposed therebetween. The sensor diaphragm 24-1 is a sheet-like diaphragm made of, for example, silicon or glass and having a strain resistance gauge formed on a surface thereof. In FIG. 1, the surface of the sensor diaphragm 24-1 having the strain resistance gauge formed thereon is indicated by diagonal lines.

The retaining members 24-2 and 24-3 are also made of silicon, glass, or the like. The first retaining member 24-2 has a recessed portion 24-2a and a pressure introducing hole (pressure guiding hole) 24-2b communicating with the recessed portion 24-2a, and the second retaining member 24-3 has a recessed portion 24-3a and a pressure introducing hole (pressure guiding hole) 24-3b communicating with the recessed portion 24-3a. The recessed portion 24-2a of the first retaining member 24-2 has a flat bottom surface, whereas the recessed portion 24-3a of the second retaining member 24-3 has a curved (aspheric) bottom surface along displacement of the sensor diaphragm 24-1.

The first retaining member 24-2 is joined to one surface (first surface) 24-1a of the sensor diaphragm 24-1, with a surrounding region 24-2c of the recessed portion 24-2a facing the first surface 24-1a of the sensor diaphragm 24-1. The second retaining member 24-3 is joined to the other surface (second surface) 24-1b of the sensor diaphragm 24-1, with a surrounding region 24-3c of the recessed portion 24-3a facing the second surface 24-1b of the sensor diaphragm 24-1.

In the pressure sensor 200A, the sensor chip 24 is joined to a bottom surface 20a of the sensor chamber 20 (or an inner wall surface of the base body 21-1), with the first retaining member 24-2 positioned on the lower side thereof. That is, a lower surface of the first retaining member 24-2 (i.e., the bottom surface 24a of the sensor chip 24) and the bottom surface 20a of the sensor chamber 20 are joined to each other, with a layer of an adhesive material (adhesive layer) 28 interposed therebetween.

In the present embodiment, the adhesive layer 28 is a layer of a soft adhesive having a Young's modulus lower than or equal to $1/1000$ of the Young's modulus of a material forming the sensor diaphragm 24-1 (i.e., a layer of an adhesive with a low Young's modulus). In this example, the material forming the sensor diaphragm 24-1 is silicon, and the adhesive layer 28 is a layer of a cured fluorine adhesive.

The Young's modulus of silicon is 190 GPa, and the Young's modulus of cured fluorocarbon resin is 10 MPa. That is, the Young's modulus of cured fluorocarbon resin is about $1/19000$ of the Young's modulus of silicon. The linear expansion coefficient of a fluorine (silicon) adhesive is several times that of an epoxy adhesive, and the Young's modulus of a cured fluorine (silicon) adhesive is $1/100$ to $1/1000$ of that of a cured epoxy adhesive. In other words, the linear expansion coefficient of an epoxy adhesive is a fraction of that of a fluorine (silicon) adhesive, and the Young's modulus of a cured epoxy adhesive is 100 to 1000 times that of a cured fluorine (silicon) adhesive. Hereinafter, the adhesive layer 28 will be referred to as a soft adhesive layer.

The bottom surface 24a of the sensor chip 24 is joined to the bottom surface 20a of the sensor chamber 20, with the pressure guiding passage 23-2 in the base body 21-1 coinciding with the pressure guiding hole 24-2b in the first retaining member 24-2 of the sensor chip 24. This allows the enclosing chamber 23 formed in the base body 21-1 by the pressure receiving chamber 23-1 and the pressure guiding passage 23-2 to communicate with the space (sensor portion) S1 formed by the recessed portion 24-2a and the pressure guiding hole 24-2b in the sensor chip 24.

With the bottom surface 24a of the sensor chip 24 joined to the bottom surface 20a of the sensor chamber 20, a narrow tube (very small diameter pipe) 31 made of stainless steel is passed through the pressure guiding passage 23-2 in the base body 21-1 and inserted and secured in the pressure guiding hole 24-2b in the first retaining member 24-2.

The narrow tube 31 has an inside diameter smaller than the inside diameter of the pressure guiding hole 24-2b in the first retaining member 24-2. The narrow tube 31 is joined, at one end (first end) thereof located in the pressure guiding hole 24-2b in the first retaining member 24-2, to the inner wall surface of the pressure guiding hole 24-2b with an adhesive (epoxy adhesive in this example) having a Young's modulus higher than the Young's modulus of the soft adhesive layer 28 between the sensor chip 24 and the base body 21-1. At the same time, the narrow tube 31 is joined, at the other end (second end) thereof passing through the pressure guiding passage 23-2 in the base body 21-1, to an inlet of the pressure guiding passage 23-2 in the base body 21-1 by welding or with an adhesive (epoxy adhesive in this example) having the same Young's modulus as the first end.

Thus, the pressure receiving chamber 23-1 on the back surface of the pressure receiving diaphragm 22 communicates through the narrow tube 31 with the recessed portion 24-2a of the first retaining member 24-2 of the sensor chip 24, and an enclosed liquid 27 is enclosed in the enclosing chamber 23 formed by the pressure receiving chamber 23-1 and the pressure guiding passage 23-2 having the narrow tube 31 inserted therein and is also enclosed in the sensor portion S1 in the sensor chip 24.

In the present embodiment, the narrow tube 31 has an outside diameter of 0.3 mm, an inside diameter of 0.15 mm, and a length of 15 mm. The size of the narrow tube 31 described here is merely an example and is not limited to this.

An upper surface 24b of the sensor chip 24 (or an upper surface of the second retaining member 24-3) is in an open state. That is, the pressure guiding hole 24-3b in the second retaining member 24-3 of the sensor chip 24 is open to the atmosphere via the through holes 21a, 21b, and 21c in the cover body 21-2.

In the pressure sensor 200A, the areas of the surfaces of the first retaining member 24-2 and the second retaining member 24-3 facing each other, with the sensor diaphragm 24-1 interposed therebetween, are different. In this example, the sensor chip 24 has a stepped structure in which the area of the second retaining member (upper retaining member) 24-3 is smaller than the area of the first retaining member (lower retaining member) 24-2.

In the stepped structure of the sensor chip 24, wires 29 (29-1, 29-2) are extended from the surface of the sensor diaphragm 24-1 having the strain resistance gauge thereon and located at an outer edge of one of the first retaining member 24-2 and the second retaining member 24-3, the one (first retaining member 24-2) extending outward from the other retaining member. The wires 29 (29-1, 29-2) extended from the sensor diaphragm 24-1 are connected to the respective electrode pins 25 (25-1, 25-2) in the relay terminal 26.

Figure 2:
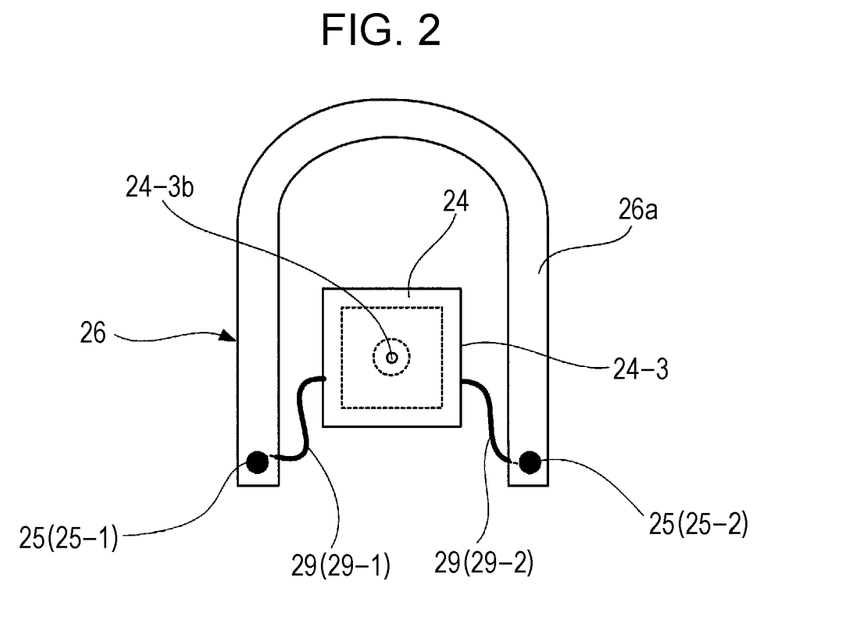
FIG. 2 is a plan view of a relay terminal provided with electrode pins (i.e., a connecting member for connection to wires extending from a sensor diaphragm) in the pressure sensor.

FIG. 2 is a plan view of the relay terminal 26. The relay terminal 26 has a U-shaped terminal block 26a made of an insulating material, and the electrode pins 25 (25-1, 25-2) passing through the terminal block 26a. The relay terminal 26 is secured by bonding to the bottom surface 20a of the sensor chamber 20. The electrode pins 25-1 and 25-2 are extended through the through holes 21a and 21b, respectively, in the cover body 21-2 to the outside of the sensor chamber 20. The sensor chamber 20 is open to the atmosphere and has no enclosed liquid therein.

In the pressure sensor 200A, a pressure P1 from a measured fluid (fluid, gas) is received by the pressure receiving diaphragm 22. The pressure P1 of the measured fluid received by the pressure receiving diaphragm 22 is transmitted to the enclosed liquid 27 in the enclosing chamber 23, passed through the narrow tube 31 in the pressure guiding passage 23-2, and guided to the first surface 24-1a of the sensor diaphragm 24-1. The second surface 24-1b of the sensor diaphragm 24-1 is open to the atmosphere through the pressure guiding hole 24-3b in the second retaining member 24-3.

This causes a strain in the sensor diaphragm 24-1. The strain in the sensor diaphragm 24-1 is detected as a change in resistance value in the strain resistance gauge. The change in resistance value is converted to an electric signal (i.e., a signal corresponding to a pressure difference), transmitted through the wires 29 (29-1, 29-2), and extracted from the electrode pins 25 (25-1, 25-2) in the relay terminal 26.

If the sensor diaphragm 24-1 is displaced by an excessive pressure applied to the first surface 24-1a of the sensor diaphragm 24-1, the entire displaced surface is received by the curved surface of the recessed portion 24-3a of the second retaining member 24-3. This prevents excessive displacement caused by the excessive pressure applied to the sensor diaphragm 24-1, prevents stress concentration on the outer region of the sensor diaphragm 24-1 to avoid breakage of the sensor diaphragm 24-1 caused by the application of the excessive pressure, and improves resistance of the sensor diaphragm 24-1 to pressure.

In the pressure sensor 200A, the sensor chip 24 is joined to the base body 21-1, with the surface 24a thereof (or the lower surface of the first retaining member 24-2) on the side of introducing the pressure of the measured fluid serving as a joint surface. In the base body 21-1, the enclosing chamber 23 is formed between the joint surface 24a of the sensor chip 24 and the pressure receiving diaphragm 22. By the enclosed liquid 27 in the enclosing chamber 23, the pressure P1 from the measured fluid received by the pressure receiving diaphragm 22 is guided through the narrow tube 31 to the first surface 24-1a of the sensor diaphragm 24-1.

That is, in the pressure sensor 200A, a passage in the narrow tube 31 having an inside diameter smaller than the inside diameter of the pressure guiding hole 24-2b in the first retaining member 24-2 serves as an actual pressure guiding passage that guides the pressure of the measured fluid to the first surface 24-1a of the sensor diaphragm 24-1. This reduces the pressure receiving area of the pressure guiding passage that guides the pressure P1 of the measured fluid to the first surface 24-1a of the sensor diaphragm 24-1 and suppresses force applied in the direction of separating the joint between the sensor chip 24 and the base body 21-1. In this example, the pressure receiving area of the pressure guiding passage that guides the pressure P1 of the measured fluid is smaller than or equal to $\frac{1}{10}$ of that in the structure without the narrow tube 31, illustrated in FIG. 8. Thus, the force applied in the direction of separating the joint between the sensor chip 24 and the base body 21-1 is significantly reduced, and a structure more resistant to high pressure is provided.

In the structure with the narrow tube 31, a force applied in the direction of separating the joint between the sensor chip 24 and the base body 21-1 is suppressed. This allows the sensor chip 24 and the base body 21-1 to be joined with an adhesive having a low Young's modulus. By the soft adhesive layer 28, which is a layer of the adhesive with this low Young's modulus, thermal stress in the shear direction is reduced. It is thus possible to avoid separation of the joint between the sensor chip 24 and the base body 21-1, not only under high pressure but also when the ambient temperature changes.

An epoxy adhesive is used to secure the narrow tube 31, whereas a fluorine adhesive is used to secure the sensor chip 24. By thus effectively using two types of adhesives, a portion required to be pressure-resistant can provide a structure that maintains its strength and minimizes the impact of heat generated by securing the sensor chip 24.

In the pressure sensor 200A, only the sensor portion S1 in the sensor chip 24 is in contact with the enclosed liquid 27 and the entire sensor chip 24 is positioned outside the enclosing chamber 23. This is to minimize the amount of the enclosed liquid 27 used. With the narrow tube 31, the amount of the enclosed liquid 27 used is further reduced. By inserting a fine wire into the narrow tube 31, a further reduction of the enclosed liquid 27 is possible.

Figure 3:
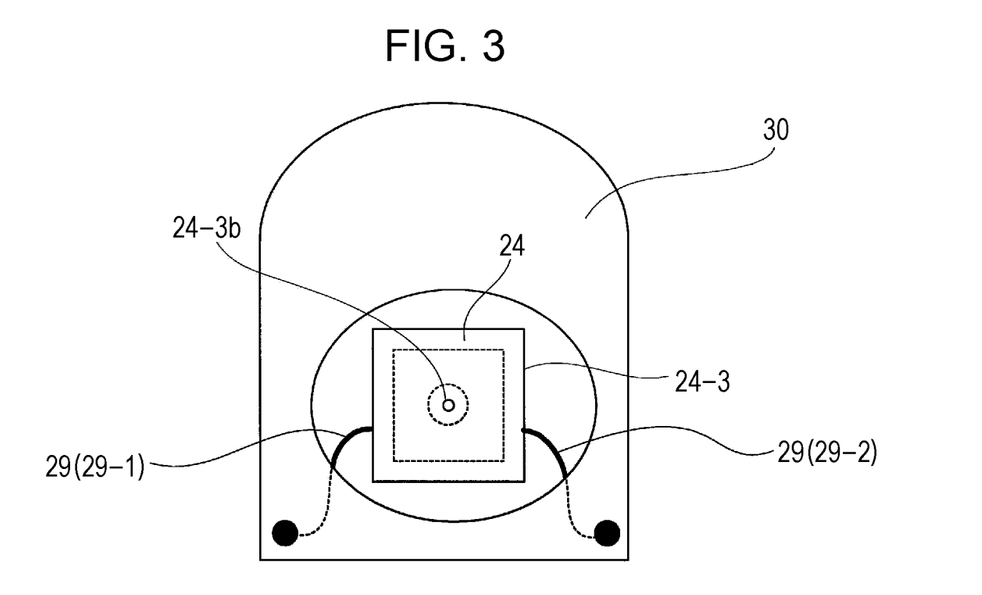
FIG. 3 is a plan view illustrating an example where a substrate having a circuit formed thereon serves as a connecting member for connection to the wires extending from the sensor diaphragm.

In the embodiment described above, the relay terminal 26 having the electrode pins 25 is provided as a connecting member for connection to the wires 29 extended from the sensor diaphragm 24-1. Alternatively, for example, as illustrated in FIG. 3, a substrate 30 having a circuit connected to the wires 29 may be provided.

Also, in the embodiment described above, the sensor chip 24 has a stepped structure in which the area of the second retaining member (upper retaining member) 24-3 is smaller than the area of the first retaining member (lower retaining member) 24-2. Alternatively, for example, as in the pressure sensor 200 (200B) illustrated in FIG. 4, the sensor chip 24 may have a stepped structure in which the area of the first retaining member (lower retaining member) 24-2 is smaller than the area of the second retaining member (upper retaining member) 24-3.

Figure 4:
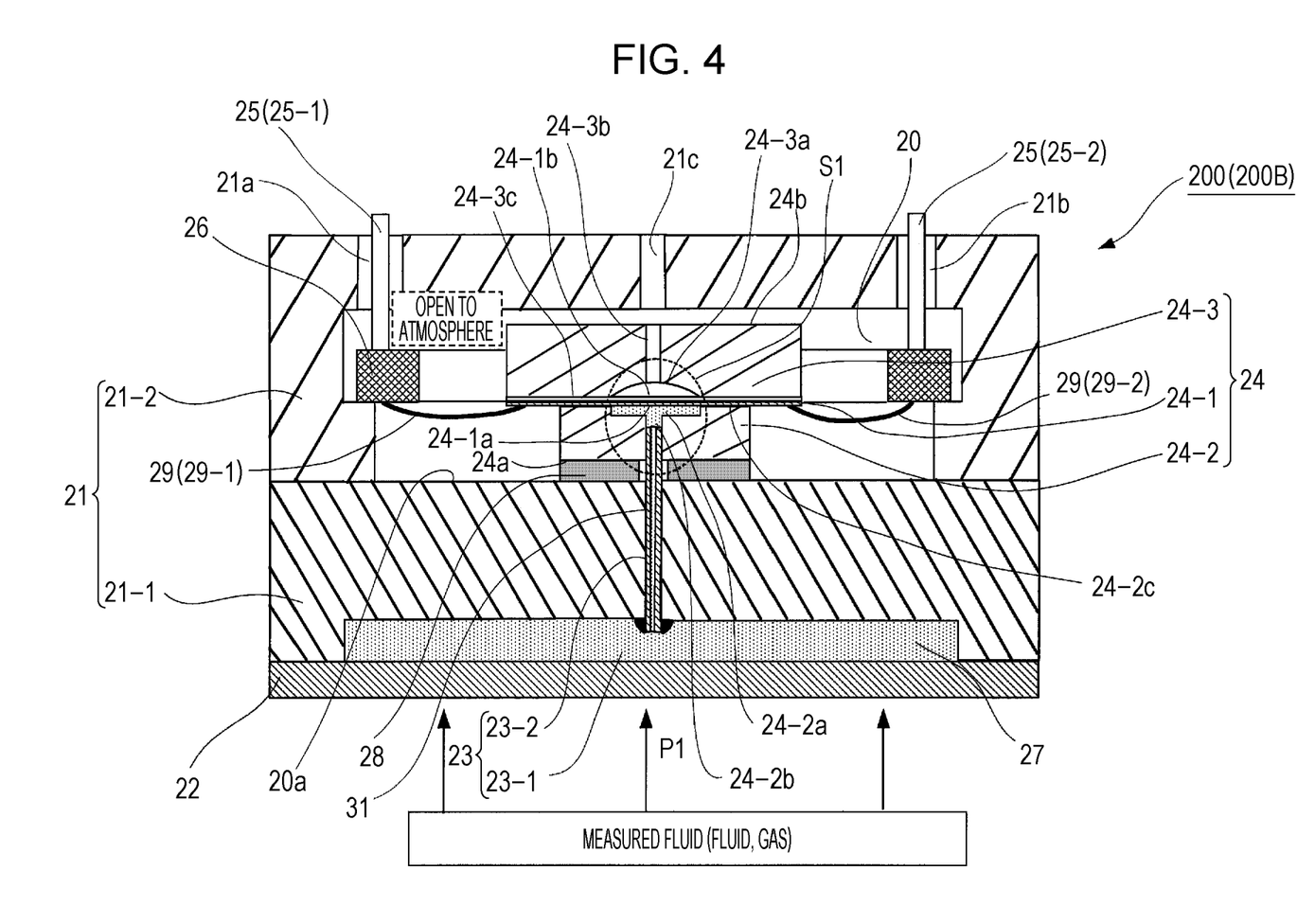
FIG. 4 illustrates an example where a sensor chip has a stepped structure in which the area of a first retaining member (lower retaining member) is smaller than the area of a second retaining member (upper retaining member).

In this case, the wires 29 (29-1, 29-2) are extended from the surface of the sensor diaphragm 24-1 having the strain resistance gauge thereon and located at an outer edge of one of the first retaining member 24-2 and the second retaining member 24-3, the one (second retaining member 24-3) extending outward from the other retaining member. The wires 29 (29-1, 29-2) extended from the sensor diaphragm 24-1 are connected to the respective electrode pins 25 (25-1, 25-2) in the relay terminal 26.

In the pressure sensor 200A structured as illustrated in FIG. 1, that is, when the sensor chip 24 has a stepped structure in which the area of the second retaining member (upper retaining member) 24-3 is smaller than the area of the first retaining member (lower retaining member) 24-2, the surface of the sensor diaphragm 24-1 having the strain resistance gauge (i.e., a sensor resistance pattern or an electrode pad) thereon is face up. This facilitates assembly, because wire bonding can be performed after the sensor chip 24 is bonded. However, the surface of the sensor diaphragm 24-1 having the sensor resistance pattern thereon is open to the atmosphere and not protected by the enclosed liquid 27. Therefore, if the side of the sensor diaphragm 24-1 open to the atmosphere is not clean, the characteristics of the sensor diaphragm 24-1 may be affected. That is, the use environment is limited and the installation environment needs to be clean.

In the pressure sensor 200B structured as illustrated in FIG. 4, that is, when the sensor chip 24 has a stepped structure in which the area of the first retaining member (lower retaining member) 24-2 is smaller than the area of the second retaining member (upper retaining member) 24-3, the surface of the sensor diaphragm 24-1 having the strain resistance gauge (i.e., a sensor resistance pattern or an electrode pad) thereon is face down. This makes assembly difficult, because wire bonding needs to be performed before the sensor chip 24 is bonded. However, the surface of the sensor diaphragm 24-1 having the sensor resistance pattern thereon is covered by the enclosed liquid 27 and thus is not exposed to the use environment (atmosphere). This allows use in any environment and gives flexibility in selecting an installation environment.

In the embodiments described above, the sensor chip 24 is joined to the bottom surface 20a of the sensor chamber 20, with the lower surface of the first retaining member 24-2 serving as the joint surface 24a thereof. Alternatively, the sensor chip 24 may be joined to the bottom surface 20a of the sensor chamber 20, with a base provided on the lower surface of the first retaining member 24-2 serving as a joint surface thereof.

Figure 5:
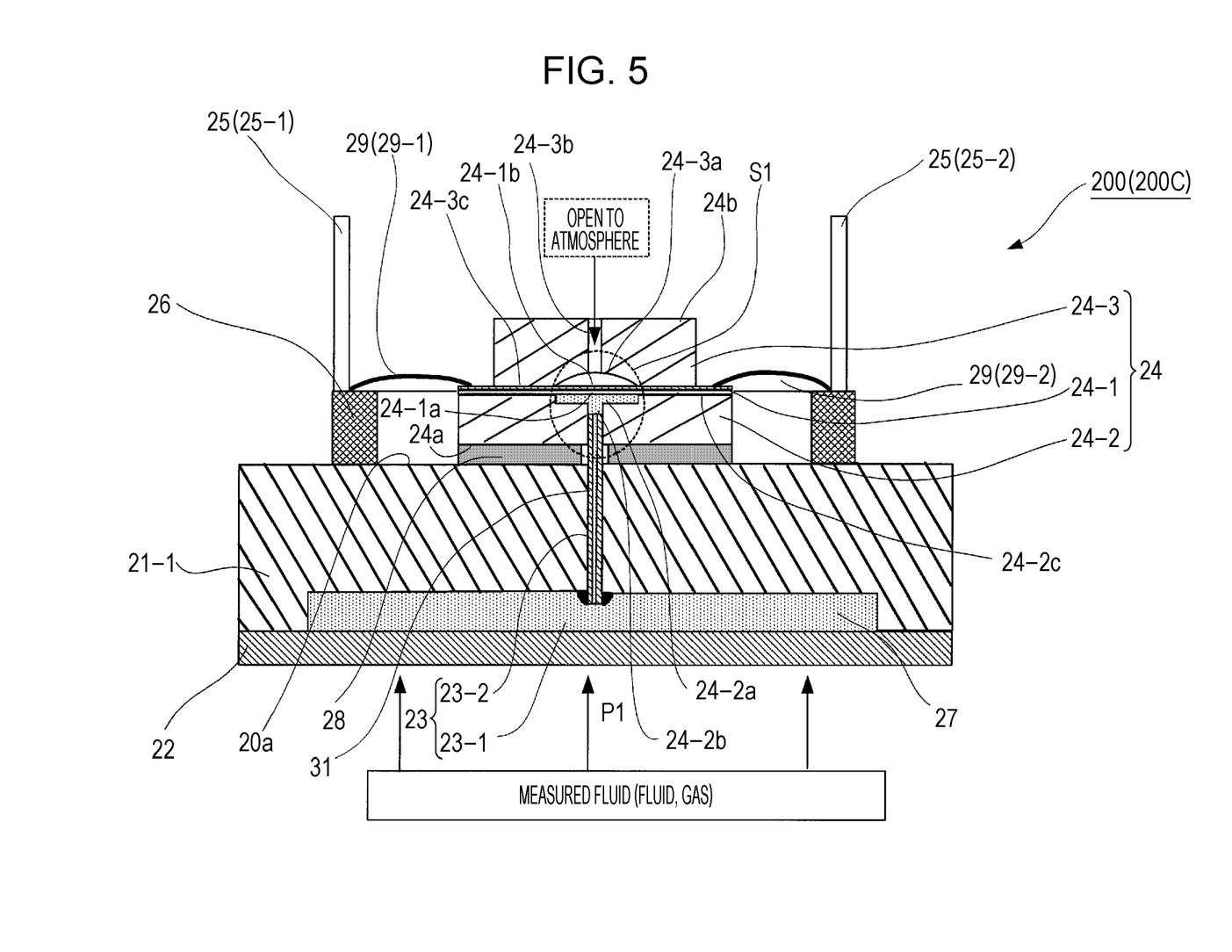
FIG. 5 illustrates an example without a cover body.

Although the base body 21-1 and the cover body 21-2 are provided to form the body 21 in the embodiments described above, the cover body 21-2 may be removed as in the pressure sensor 200 (200C) illustrated in FIG. 5. The pressure sensor 200A illustrated in FIG. 1 does not necessarily require the cover body 21-2, because the entire sensor chip 24 is positioned outside the enclosing chamber 23. Without the cover body 21-2, as in the pressure sensor 200C illustrated in FIG. 5, it is possible to further reduce size and cost.

In the embodiments described above, a soft adhesive layer (fluorine adhesive layer) is used as the adhesive layer 28 between the sensor chip 24 and the base body 21-1 to reduce thermal stress in the shear direction. However, the adhesive layer 28 does not necessarily need to be a soft adhesive layer and may be an epoxy adhesive layer. That is, with the narrow tube 31, it is possible to suppress force applied in the direction of separating the joint between the sensor chip 24 and the base body 21-1. Although thermal stress in the shear direction may not be reduced in this case, it is possible to improve resistance to pressure.

The second surface 24-1b of the sensor diaphragm 24-1 is made open to the atmosphere in the embodiments described above. However, for example, as in the pressure sensor 200 (200D) illustrated in FIG. 6, the lower surface of the first retaining member 24-2 may be joined to the bottom surface 20a of the sensor chamber 20 (or the inner wall surface of the base body 21-1) with a soft adhesive layer 28-1 interposed therebetween, the upper surface of the second retaining member 24-3 may be joined to an upper surface 20b of the sensor chamber 20 (or an inner wall surface of the cover body 21-2) with a soft adhesive layer 28-2 interposed therebetween, and narrow tubes 31-1 and 31-2 may be provided in pressure guiding passages on both sides of the sensor diaphragm 24-1.

Figure 6:
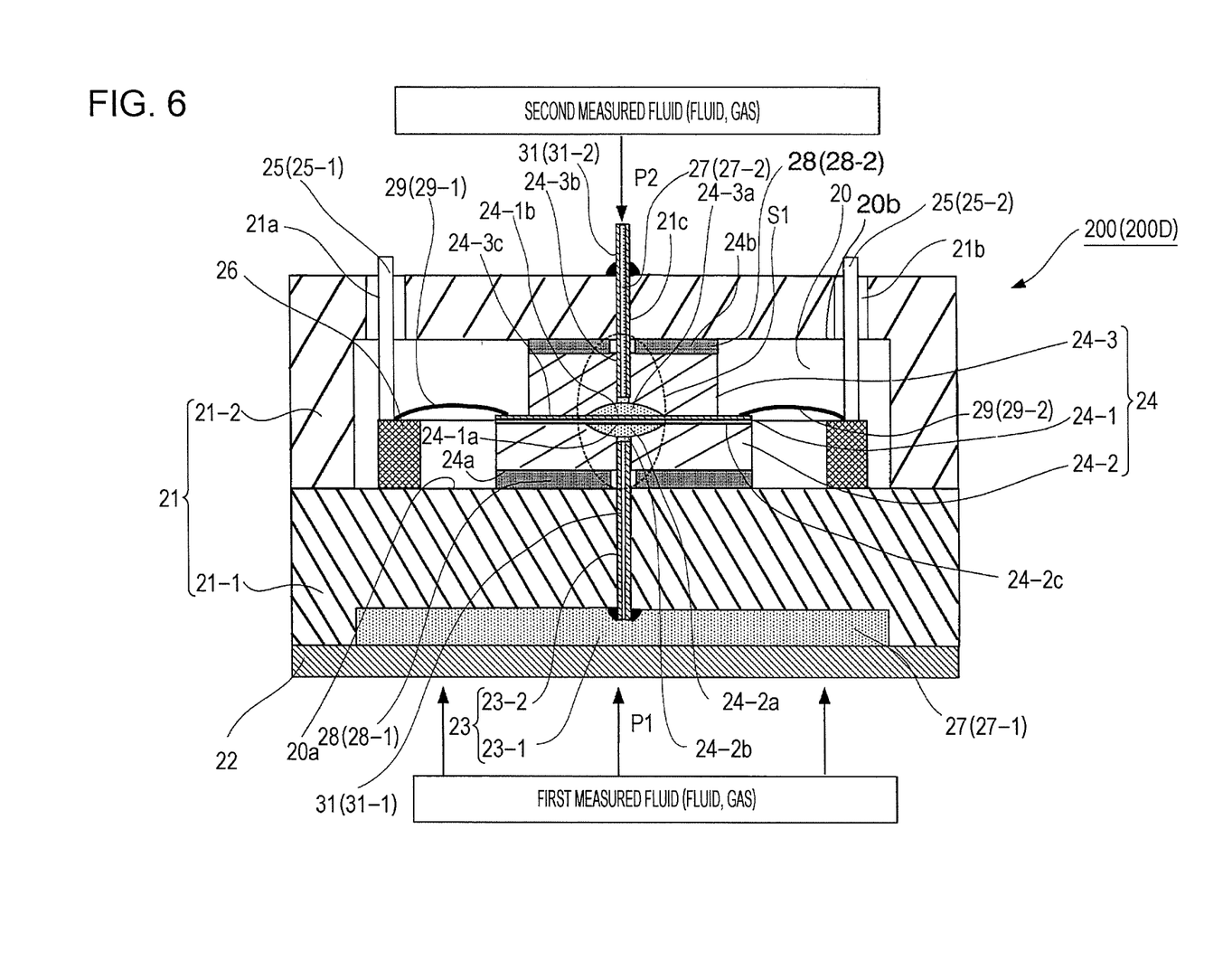
FIG. 6 illustrates an example where pressure guiding passages on both sides of the sensor diaphragm are provided with narrow tubes.

While the side of the narrow tube 31-2 is not shown in FIG. 6, a pressure P2 from the measured fluid (second measured fluid) received by a pressure receiving diaphragm on the side of the narrow tube 31-2 is transmitted to an enclosed liquid 27-2, passed through the narrow tube 31-2, and guided to the second surface 24-1b of the sensor diaphragm 24-1, as on the side of the narrow tube 31-1. This allows detection of a difference between the pressure P1 of the measured fluid (first measured fluid) applied to the first surface 24-1a of the sensor diaphragm 24-1 and the pressure P2 of the measured fluid (second measured fluid) applied to the second surface 24-1b of the sensor diaphragm 24-1.

In the configuration illustrated in FIG. 6, the soft adhesive layers 28-1 and 28-2 have the function of securing the sensor chip 24 in place, rather than the function of retaining airtightness. One of the soft adhesive layers 28-1 and 28-2 may be removed, as long as the sensor chip 24 is reliably secured in place.

Expansion of Embodiments

The present invention has been described with reference to the embodiments, but the present invention is not limited to the embodiments described above. Various changes that can be understood by those skilled in the art can be made to the configurations and details of the present invention within the scope of the technical ideas of the present invention.

INDUSTRIAL APPLICABILITY

The present invention is applicable to industrial pressure sensors.

REFERENCE SIGNS LIST

20: sensor chamber, 20a: bottom surface, 20b: upper surface, 21: body, 21-1: base body, 21-2: cover body, 22: pressure receiving diaphragm, 23: enclosing chamber, 23-1: pressure receiving chamber, 23-2: pressure guiding passage, 24: sensor chip, 24a: bottom surface (joint surface), 24-1: sensor diaphragm, 24-1a: first surface, 24-1b: second surface, 24-2: first retaining member, 24-2a: recessed portion, 24-2b: pressure introducing hole (pressure guiding hole), 24-2c: surrounding region, 24-3: second retaining member, 24-3a: recessed portion, 24-3b: pressure introducing hole (pressure guiding hole), 24-3c: surrounding region, 25 (25-1, 25-2): electrode pin, 26: relay terminal, 27 (27-1, 27-2): enclosed liquid, 28 (28-1, 28-2): adhesive layer (soft adhesive layer), 29 (29-1, 29-2): wire, 30: substrate, 31 (31-1, 31-2): narrow tube, 200 (200A to 200D): pressure sensor

The invention claimed is:

1. A pressure sensor, comprising:
a sensor chip including a sensor diaphragm configured to output a signal corresponding to a difference between pressures received by a first surface and a second surface of the sensor diaphragm, a first retaining member joined to the first surface of the sensor diaphragm, and a second retaining member joined to the second surface of the sensor diaphragm, wherein the first retaining member has a first recessed portion formed in an end surface thereof joined to the first surface of the sensor diaphragm and a first pressure guiding hole open into the first recessed portion to guide a pressure of a measured fluid to the first surface of the sensor diaphragm, and the second retaining member has a second recessed portion formed in an end surface thereof joined to the second surface of the sensor diaphragm and a second pressure guiding hole open into the second recessed portion to allow the second surface of the sensor diaphragm to be open to the atmosphere;
a body to which the sensor chip is joined, the body having a pressure guiding passage configured to guide the pressure of the measured fluid to the first pressure guiding hole in the first retaining member; and
a narrow tube having an inside diameter smaller than an inside diameter of the first pressure guiding hole in the first retaining member, passed through the pressure guiding passage in the body, and inserted and secured in the first pressure guiding hole in the first retaining member in such a manner as to guide the pressure of the measured fluid to the first surface of the sensor diaphragm, wherein the narrow tube is
joined, at a first end thereof located in the first pressure guiding hole in the first retaining member, to an inner wall surface of the first pressure guiding hole with an adhesive having a Young's modulus higher than a Young's modulus of an adhesive layer between the sensor chip and the body; and
joined, at a second end thereof passing through the pressure guiding passage in the body, to an inlet of the pressure guiding passage in the body by welding or with an adhesive having a same Young's modulus as the first end.
2. The pressure sensor according to claim 1, wherein the sensor chip is joined to the body with the adhesive layer interposed therebetween; and
the adhesive layer is a layer having a Young's modulus lower than a Young's modulus of a material forming the sensor diaphragm.

* * * * *

UNITED STATES PATENT AND TRADEMARK OFFICE
CERTIFICATE OF CORRECTION

| | |
|---|---|
| PATENT NO. | : 11,137,307 B2 |
| APPLICATION NO. | : 16/065550 |
| DATED | : October 5, 2021 |
| INVENTOR(S) | : Ayumi Tushima et al. |

Page 1 of 1

It is certified that error appears in the above-identified patent and that said Letters Patent is hereby corrected as shown below:

On the Title Page

Item (30), the Foreign Application Priority Data's information is incorrect. Item (30) should read:
--(30) Foreign Application Priority Data
Dec. 25, 2015 (JP)....................2015-253627--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*